Sept. 15, 1925.
T. MIDGLEY
1,554,015
TIRE MOLD
Filed March 5, 1925
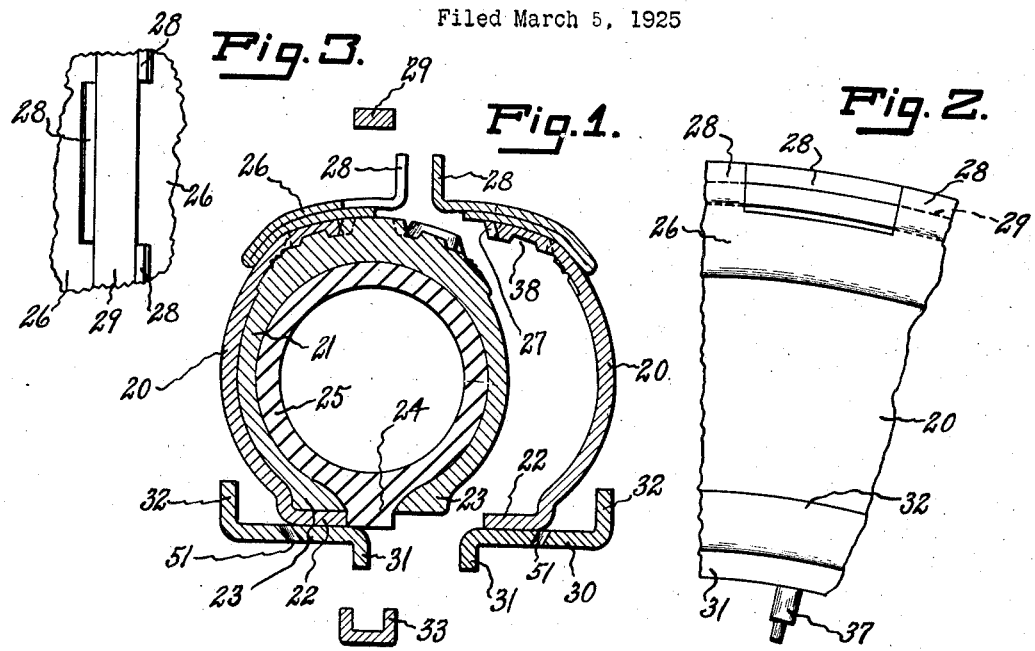
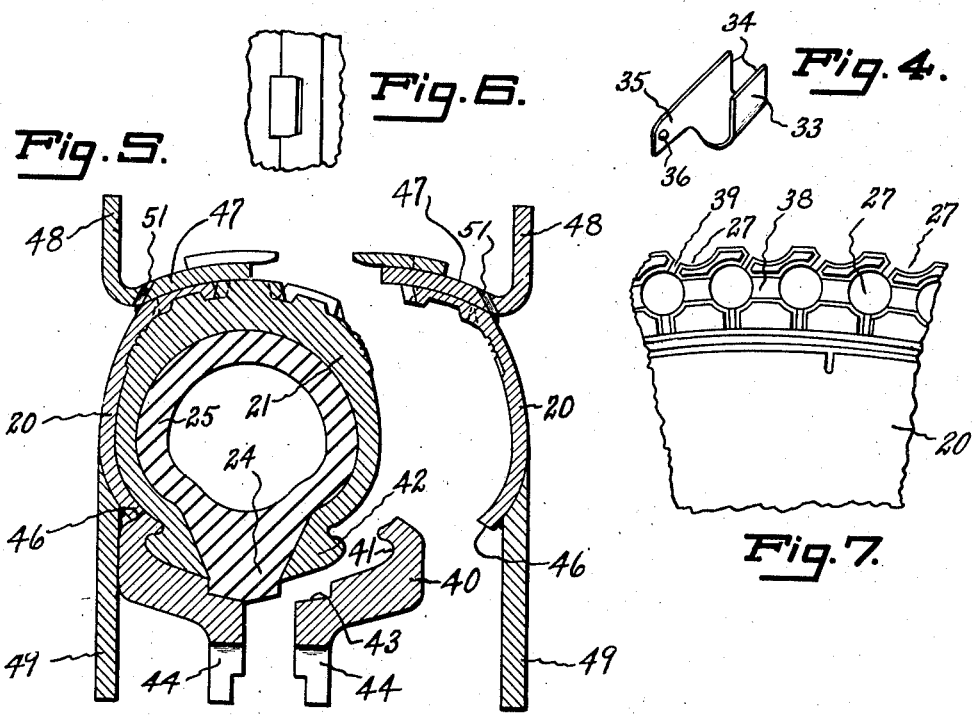
INVENTOR.
Thomas Midgley
Edward C. Taylor
BY
ATTORNEY.

Patented Sept. 15, 1925.

1,554,015

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE MOLD.

Application filed March 5, 1925. Serial No. 13,098.

*To all whom it may concern:*

Be it known that I, THOMAS MIDGLEY, a citizen of the United States of America, residing at Hampden, in the county of Hampden and State of Massachusetts, have invented certain new and useful Improvements in a Tire Mold, of which the following is a specification.

This invention relates to improvements in molds particularly designed for the manufacture of automobile tires, and is more especially directed to the construction of such molds out of sheet material such as steel. Among the objects of the invention may be mentioned the production of a mold having a minimum of metal consistent with strength, whereby less heat will be absorbed by the mold itself in warming up and retained by it after vulcanization has ceased; and the elimination of the necessity for expensive bottoming operations in the preparation of the relief portions of the mold which molds the tread design. This application is a continuation in part of my prior application Serial No. 659,813, filed August 28, 1923.

As constructed at the present day, automobile tires are provided with a tread surface figured with various designs in relief, serving as a design connoting the maker of the tire and as a means of preventing skidding. In the present commercial method of making these molds they are formed roughly of cast iron or steel, machined to shape, and the desired design cut or engraved by machine in reverse in the mold walls. This engraving of the pattern is one factor contributing to the high cost of the present molds, and it is one object of this invention to do away with it as far as the nature of the design permits. It is a further object to construct the mold with a minimum thickness of metal consistent with the necessary strength, which, in the molding of modern cord tires cured under internal expansion, is chiefly required to resist this expansive action.

The invention has been illustrated in two specific embodiments in the accompanying drawings, in which—

Fig. 1 is a section through one side of a mold constructed in accordance with one form of the invention, half of the mold being separated from the tire;

Fig. 2 is a fragmentary side elevation of the assembled mold;

Fig. 3 is a fragmentary top plan of the assembled mold;

Fig. 4 is a perspective view of a clip;

Fig. 5 is a view, similar to Fig. 1, of a modified manner of constructing the mold;

Fig. 6 is a fragmentary top plan of this modification when assembled; and

Fig. 7 is a development of a portion of the interior of the mold, showing the manner of forming the tread pattern.

Certain features of this invention are in the nature of improvements on the molds shown in my prior applications Serial Numbers 621,425 and 625,728, filed February 26, 1923 and March 17, 1923, respectively. The present mold differs from those of my prior applications mainly in having the machine work for producing the tread design greatly reduced, and the mold constructed entirely of sheet metal. The reduction of machine work is of importance in economy of manufacture of the molds, and the construction of the molds out of sheet metal enables their weight and heat-absorbing capacity to be reduced to a minimum, with resulting economies in actual use.

Referring particularly to the embodiment shown in Figs. 1, 2, 3, and 4, the mold comprises annular sheet metal side plates 20, curved to enclose the side walls and a portion of the tread of the tire 21. Inturned flanges 22 at the inner periphery of each plate are adapted to underlie the bead portions 23 of the tire and to afford between them a space for the reception of the base 24 of the air bag 25 by which the tire is stretched into the mold during vulcanization. If a bag smaller in circumference at its base than the beads of the tire (a so-called "drop base" bag) is not to be used, the flanges 22 may be extended until they meet when the mold is assembled.

Overlying the outer periphery of the side plates, and permanently secured thereto, are folded plates 26. The innermost folds of these plates terminate at 27 a little past the ends of the side plates, and are adapted to abut when the mold is assembled. The outer folds of the plates have alternate lugs 28, the lugs on each plate passing through corresponding notches in the other. These lugs present, when the mold is assembled, something the appearance of the interlaced fingers of the two hands with the back of the hands down. The lugs on one plate extend sufficiently beyond those of the other to present a space between them for a transversely split ring 29 which, when sprung into place, will hold the mold sections firmly together.

The folded plates 26 (whose folded character represents only the preferred way of constructing them), besides performing their function of cooperating with the split ring to hold the mold assembled, also perform an important part in the production of the raised pattern upon the tread of the tire. The tread design which has been chosen as an exemplification comprises a central longitudinal bar having spaced rounded sidewise projections, so that in effect it is composed of a longitudinal series of buttons joined by connecting bars of the same height. On either side of this central bar are series of buttons joined by connecting bars of lesser height, so that these side buttons project above their bars while the central buttons and bars are flush. The two sets of buttons are formed during molding by holes 27 punched in plates 20, these holes being covered by plates 26. The central bar is formed by the space between the plates 20, this space being bridged by plates 26 so as to form a circumferential molding recess.

In Fig. 7 has been shown a development of the inner surface of plate 20, this development being illustrative of either of the modifications shown. This plate is perforated at 27 to correspond with the buttons or other design to appear in maximum relief on the tread of the tire, and has other channeled portions 38 corresponding to those portions of the design of lesser elevation. Slots 39, which in the molding produce connecting vents for the different parts of the design, may also be formed. The formation of plates 20 and the preparation of the design upon it, may be by any preferred machining or punching operation. When the plate 20 is suitably formed and the design punched or machined it is fitted tightly to the cover plate 26 and sweated, brazed, or welded thereto. The permanent combination of these plates creates an assembly which in its molding function parallels the usual cast and machined molds, but without the necessity of machine work being done on the bottoms of the holes forming the buttons, etc., an operation always attended by considerable expense, and lends itself to a mold having a very light yet strong construction.

The manner of making this mold is claimed by me in my copending application Serial No. 13,099, filed concurrently herewith.

To the flanges 22 are secured, preferably by spot welding, rings 30 having inwardly extending abutting flanges 31 and outwardly turned flanges 32 adapted to support the molds upon each other in stack formation if they are to be piled in a heater. Attached to the flanges 31 at intervals around their circumference are clips 33 (Fig. 4) having a body portion 34 bent in U-shaped form to join together the adjacent flanges 31, and an attaching ear 35 through a hole 36 in which the clips are pivotally riveted to the flanges. By rotating the clip on its pivot the two mold halves can be freed from each other to permit their removal from the vulcanized tire. These clips may be used to assist lugs 28 in keeping the mold closed during vulcanization, but their function in cases where the molds are stacked in a hydraulic press type of heater is mainly in holding the mold halves together until the ring 29 is applied.

At one point in the circumference of flanges 31 they are suitably recessed to receive the valve stem 37 of the air bag 25, through which internal fluid pressure is supplied to the tire being vulcanized. These recesses may serve alone to align the mold halves properly together so that the two halves of the tread design will be in proper registration, or other means such as dowel pins may be employed. One preferred alternative manner of accomplishing this is to provide flanges 31 with registering holes which may be lined up during the assembly of the mold by a suitable pin.

The mold shown in Figs. 5 and 6 is similar in the formation of its molding pattern to that described above, but the remainder of its construction is altered to adapt it more particularly for use upon clincher tires and in the vertical type of vulcanizing press. For this purpose the mold has been adapted to the employment of so-called bead rings 40, which have molding recesses 41 to receive the clincher tire bead 42, shoulders 43 to receive the drop base 24 of the pressure bag 25, and inwardly extending flanges 44 which may be secured together by clips or by bolts 45. The side plates 20 in this form of mold terminate in angular planes 46 which, as shown at the left of Fig. 5, abut the sides of the bead ring and form therewith a continuous molding surface. The cover plates 47, instead of being refolded on themselves and having flanges on their edges nearest the central plane of the tire as in the modification shown in Fig. 1, are made somewhat thicker and are bent outwardly to form flanges 48 having their surfaces substantially tangent to the sides of the mold. Attached to the side plates as by spot welding or other means are plates 49 which, when the mold is assembled, bear against the sides of the bead rings 40. The plates 49 and flanges 48 preferably lie in the same plane, tangent to or slightly spaced beyond the widest curve of the side plates. The manner of arranging the flanges and bearing plates in this modification is covered in my copending application Serial No. 703,580, filed September 24, 1924.

In either type of mold drain holes 51 may be provided at points where condensed steam or cooling water would otherwise be trapped during the use of the mold.

Having thus described my invention, I claim:

1. A mold adapted for use in the vulcanization of a tire casing comprising annular side plates curved to impart the desired form to the tire and having apertures in the tread portion, and a backing overlying the plates to cover said apertures and forming thereby cavities for molding a pattern in relief upon the tire.

2. A mold adapted for use in the vulcanization of a tire casing comprising annular halves shaped to receive the casing and impart the desired form thereto, each mold half including pieces permanently secured together, one having apertures therein and another overlying and closing the apertures, whereby molding recesses are provided to impress a tread pattern on the tire.

3. A mold adapted for use in the vulcanization of a tire casing and constructed in mating annular halves; each half comprising a side plate shaped to impart the desired cross-sectional form to the tire and having apertures therein, and a second plate permanently attached thereto so as to overlie said apertures and close them to form molding recesses adapted to produce a raised pattern on the tire.

4. A mold adapted for use in the vulcanization of a tire casing and constructed in mating annular halves; each half comprising a side plate shaped to impart the desired cross-sectional form to the tire and having apertures therein, and a second plate in each mold half overlying said apertures and closing them to form molding recesses adapted to produce a raised pattern on the tire; said second plates having interlocking devices adapted to hold the mold halves in assembled relation.

5. A mold adapted for use in the vulcanization of tire casings and constructed in mating annular halves; each half comprising a side plate shaped to impart the desired cross-sectional form to the tire, having apertures therein, and terminating short of the central plane of the mold when assembled, and a second plate in each mold half overlying said apertures and bridging the gap between the side plates, whereby a central annular molding groove is produced and molded recesses are formed adapted to produce a raised pattern on the tread.

6. A mold adapted for use in the vulcanization of tire casings which comprises a tread molding portion constructed of a perforated member and an overlying backing plate permanently attached thereto.

7. A mold adapted for use in the vulcanization of tire casings which comprises a tread molding portion constructed of a punched out sheet metal plate and an overlying sheet metal plate permanently secured thereto.

8. In a mold adapted for use in the vulcanization of tire casings and constructed in mating annular halves, attaching devices for holding the mold halves assembled during use comprising interfitting lugs attached to the two mold halves, the lugs on each half extending by the lugs on the other half and being directed substantially in the plane of the mold, and a transversely split ring adapted to lie within the space bounded by the two sets of lugs when interfitted.

9. A mold adapted for use in the vulcanization of a tire casing and constructed in mating annular halves; each half comprising a side plate and an overlying plate, the side plates being shaped to impart the desired cross-sectional form to the tire, being provided with apertures therein, and terminating short of the central plane of the mold when assembled, and the overlying plates being folded with the inner fold covering the apertures and extending so as to meet at the central plane of the mold so as to bridge the gap between the side plates and form therewith a molding groove adapted to produce a central circumferential rib on the tire, and the outer fold being formed with alternating interlocking lugs adapted to pass by each other and receive between them a ring functioning to hold the two mold halves in assembled relation.

THOMAS MIDGLEY.